(12) United States Patent
Kim et al.

(10) Patent No.: US 6,333,102 B1
(45) Date of Patent: Dec. 25, 2001

(54) EXPANDABLE REINFORCING SHEET MATERIAL FOR VEHICLE OUTER PANEL

(75) Inventors: Jin Soo Kim, Ulsan; Hu Ryeong Ju, Kyoungki-do, both of (KR)

(73) Assignees: Hyundai Motor Company; Hong Seong Chemical Co., Ltd., both of Seoul (KR)

(*) Notice: Subject to any disclaimer, the term of this patent is extended or adjusted under 35 U.S.C. 154(b) by 0 days.

(21) Appl. No.: 09/573,345

(22) Filed: May 19, 2000

(30) Foreign Application Priority Data

Jul. 30, 1999 (KR) .................................................. 99-31309

(51) Int. Cl.$^7$ ...................................................... B32B 3/26
(52) U.S. Cl. ..................................... 428/319.1; 428/318.4; 521/98; 521/148; 521/149; 524/80; 524/495
(58) Field of Search ............................... 428/318.4, 319.1

(56) References Cited

FOREIGN PATENT DOCUMENTS 63272515    11/1988  (JP).

*Primary Examiner*—Blaine Copenheaver
*Assistant Examiner*—Leanna Roché

(57) ABSTRACT

Expandable reinforcing sheet material for vehicle outer panel, comprising nitrile butadiene rubber (NBR) modified epoxy resin, bisphenol A type epoxy resin, potassium-zincs thermal stabilizer, calcium carbonate, polyvinyl chloride, carbon black, azodicarbonamides expanding agent, expanding accelerator, adhesion supplying agent, and dicyandiamide, provides excellent adhesion ability to the outer panel of the vehicle, good workability, vibration damping capacity can be suitable for applying to the outer panel of vehicle and thus the outer panel of vehicle on the backside of which the reinforcing material is attached can become lighter and thinner.

2 Claims, 1 Drawing Sheet

EXPANDABLE REINFORCING SHEET MATERIAL FOR VEHICLE OUTER PANEL

FIELD OF THE INVENTION

The present invention relates to expandable reinforcing sheet material, particularly expandable reinforcing sheet material for vehicle outer panel comprising nitrile butadiene rubber modified epoxy resin, bisphenol A type epoxy resin, heat stabilizer, expansion agent, expansion accelerator, adhesion providing agent, heat activation type hardener, and filler, which can be expanded by heat and the gravity thereof can be reduced. The expandable reinforcing sheet material has excellent adhesion ability to the outer panel of the vehicle, good workability, vibration damping capacity can be suitable for applying to the outer panel of vehicle. The outer panel of vehicle on the backside of which the reinforcing material is attached can become lighter and thinner.

BACKGROUND OF THE INVENTION

In vehicles, use of thinner panels has been required for saving energy. This results in reduced strength, which causes automobiles insufficient surface tensional rigidity and insufficient solid appearance.

In order to solve the problems, there were proposed various processes for producing a vehicle outer panel structure having lightweightness. For example in the laid open of Japanese Patent Application No 1988-272515, there was proposed a process which comprises attaching to the backside of a panel sheet material having a three layer structure consisting a first layer which is a foamable composition comprising as essential component, a vinyl chloride resin, a plasticizer, a high temperature decomposition type expansion agent, an epoxy resin and a heat activation type hardener for epoxy resin, a second layer which is a cloth, and a third layer which is a thin metal film, and then heating the resulting panel to allow the sheet material to give resin to expand and hardening.

In this process, however, the foamable composition contains a vinyl chloride resin as a thermoplastic resin, and therefore has poor adhesion to oily surface and, when heated to give rise to expand and hardening, gives a sheet of poor heat resistance.

Hence, the process is applicable to vehicle outer panels after electro deposition but inapplicable to vehicle outer panels before electro deposition.

In the automobile industry, attaching of reinforcing sheet material to vehicle outer panel before electro deposition is strongly desired for higher productivity or for use of such a reinforcing sheet material to as many applications as possible.

Especially, the reinforcing material for the quarter panel part and the door fender panel of vehicles uses a stainless steel or a fiber grass as the restraint layer, and an unexpandable pad is adhered to the backside of the restraint layer with the thickness of 1.5~2.5 mm. And finally a releasing paper is covered on the unexpandable type pad to protect the unexpandable pad.

That is, since the quarter panel and the door fender panel of the vehicle have the curved shape, the expandable pad is used as the reinforcing sheet material of the curved portion of vehicle. Then the reinforcing sheet material for the quarter panel and the door fender panel is separated partially after electro deposition. And water or a foreign substance is inserted into the gap between the panel and the reinforcing sheet, which causes the panel of the vehicle to get rust.

On the other hand, in order to solve the problem the glass wool is used as the restraint layer, the glass wool also cannot give a sufficient solution.

SUMMARY OF THE INVENTION

The object of the present invention is to provide expandable reinforcing sheet material for curved outer panel of vehicle comprising a nitrile butadiene rubber used as basic material and polyvinyl chloride, and having excellent adhesion to the outer panel of the vehicle, good workability, vibration damping capacity.

The other object of the present invention is to provide a reinforcing sheet comprising the reinforcing sheet material above described become lighter and thicker.

The present invention to achieve the above object comprises expandable reinforcing sheet material for vehicle outer panel comprising nitrile butadiene rubber (NBR) modified epoxy resin, bisphenol A type epoxy resin, potassium-zincs thermal stabilizer, calcium carbonate, polyvinyl chloride, carbon black, azodicarbonamides expanding agent, expanding accelerator, adhesion providing agent, and dicyandiamide. This reinforcing sheet material has high ratio of expansion and the outer panel of vehicle to which the reinforcing sheet material become lighter and thinner.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PRESENT INVENTION

Figure 1:
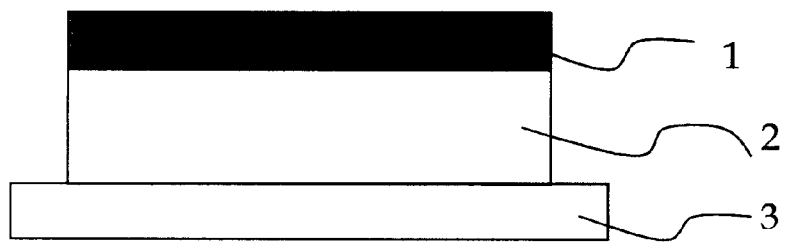
FIG. 1 is a section view of the reinforcing sheet comprising an expandable reinforcing sheet material, a restraint layer for restraining the reinforcing sheet material, and a releasing paper for covering the reinforcing sheet material in accordance with the present invention

The expandable reinforcing sheet material in accordance with the present invention comprises 10~14 weight % of nitrile butadiene rubber (NBR) modified epoxy resin alone or nitrile butadiene rubber (NBR) modified epoxy resin mixed with another modified epoxy resin selected from the group consisting of carboxyl terminated butadiene acrylonitrile polymer (CTBN), amine terminated butadiene acrylonitrile polymer (ATBN) and methacrylate vinyl terminated butadiene acrylonitrile polymer (VTBN), 5~20 weight % of bisphenol A type epoxy resin, 0.3~4 weight % of potassium-zincs thermal stabilizer, 17~30 weight % of calcium carbonate, 10~20 weight % of polyvinyl chloride, 1~2 weight % of carbon black, 3~5 weight % of azodicarbonamides expanding agent, 0.3~2 weight % of expanding accelerator, and 4~7 weight % of adhesion providing agent, 0.1~2 weight % of dicyandiamide.

The expandable reinforcing sheet material comprising the above materials has excellent adhesion to the oily steel panel of vehicle. The reinforcing sheet material is expanded and hardened by heat and tightly adheres to the surface of the oily panel. And the reinforcing sheet material in accordance with the present invention is expanded in about 100% or more of its original volume and has excellent reinforcing capacity and the vibration damping capacity.

The expandable reinforcing sheet material in accordance with the present invention comprises NBR modified epoxy resin, bisphenol A type epoxy resin, thermal stabilizer, filler having calcium carbonate, polyvinyl chloride, carbon black, expansion agent, expansion accelerator, adhesion providing agent, and inclosed type hardener.

10~14 weight % of the NBR modified epoxy resin alone or nitrile butadiene rubber (NBR) modified epoxy resin mixed with another modified epoxy resin selected from the group consisting of carboxyl terminated butadiene acrylonitrile polymer (CTBN), amine terminated butadiene acrylonitrile polymer (ATBN) and methacrylate vinyl terminated butadiene acrylonitrile polymer (VTBN) and 5~20 weight % of the bisphenol A type epoxy resin are used in order to supply the adhesion strength and impact resistance capacity. Then if the amount of the NBR modified epoxy resin used is out of the above range, it is not preferred because there are problems in the separation of the reinforcing sheet and the impact resistance capacity.

And if the bisphenol A type epoxy is less than 5 weight %, the adhesion capacity of the reinforcing sheet material in accordance with the present invention become low. Whereas the amount of the bisphenol A type epoxy resin is excess 20 weight %, the adhesion strength is increase that causes problems about separation and crack in the reinforcing sheet material in accordance with the present invention.

The potassium-zincs thermal stabilizer is used to increase the thermal stability. Then if the amount of the potassium-zincs thermal stabilizer is less than 0.3 weight %, the thermal resistance capacity is decreased. Whereas the amount of the potassium-zincs thermal stabilizer is excess 4-weight %, the adhesion capacity and the storage stability are decreased.

The calcium carbonate is used as filler that give rise volume of the reinforcing sheet in accordance with the present invention. Then if the amount of the calcium carbonate is out of the above range, it is difficult that volume of the reinforcing sheet is maintained, and workability and the adhesion ability are decreased.

The polyvinyl chloride is used in order to give expansion capacity to the reinforcing sheet material in accordance with the present invention. Then if the amount of the polyvinyl chloride is less than 10 weight %, the heat resistance ability is decreased. Whereas if the amount of the polyvinyl chloride is excess 20 weight %, the expansion ability and adhesion strength are increased but thermal resistance is decreased and ageing is promoted.

The carbon black is used in order to give coloration and rigidity. Then if the amount of the carbon black is out of the above range, the rigidity is decreased or is exceeded.

The azodicarbonamides expansion agent is used in order to give expansion ability to the reinforcing sheet in accordance with the present invention. Then if the azodicarbonamides expansion agent is less than 0.3 weight %, there is a problem that the reinforcing sheet material is not expanded because the decomposition temperature of the expansion agent is not lowed. Whereas if the amount of the azodicarbonamides expansion agent is excess 2 weight %, the residual reactant restricts the expansion rate and the expansion form of the reinforcing sheet material in accordance with the present invention.

The expansion accelerator is selectively used between ZnO and Zn—St.

The expansion rate of the reinforcing sheet material in accordance with the present invention is 150~200 % of its original volume.

4~7 weight % of the adhesion agent is used in order to provide the adhesion ability and the workability to the reinforcing sheet. Then if amount of the adhesion agent is less than 4 weight %, the workability is decreased. Whereas if the amount of the adhesion agent exceeds 7 weight %, workability and initial adhesion ability become low.

The adhesion agent can be prepared by kneading monomeric interpolymerization resin (K-value 50 or thereabout), interpolymerization resin (PVC) of 50~100 $\mu$m in grain size, and DOP(dioctyl phthalate) and DOA (dioctyl adipate) that are the mixed plasticizer using a known kneader such as planetary mixer, kneader, roller or the like.

The present invention can use 0.1~2 weight % of dicyandiamide as hardener in order to prevent the prompt decreasing of the penetration degree on storage the reinforcing sheet material at the normal temperature. Then, if the amount of the dicyandiamide is less than 0.1 weight %, the hardening operation is not completely done and the hardness and the adhesion strength become low. Whereas if the amount of the dicyandiamide exceeds 2 weight %, the separation ability of the adhesion surface and the invasion ability of the storage stability are decreased.

The reinforcing sheet material in accordance with the present invention is prepared by the following method.

FIG. 1 shows the partial cross-section of the reinforcing sheet assembly in accordance with the present invention. An expandable reinforcing sheet 2 is made of the expandable resin composition prepared by the composition described above, which is extruded by an extruding machine and pass through between two rolls to be a certain thickness.

A restraint layer 1 is attached on the one surface of the expandable sheet 2 and a releasing paper 3 is attached on the other surface of the expandable sheet 2. The sheet assembly is continuously prepared and cut to a certain size by a cutter to be a proper size adapted to the curved outer panel of the vehicle.

The expandable sheet 2 is expanded by heating at 150~190° C. of temperature for 15~40 minutes that is condition of the electro deposition of the vehicle assembling line and can have excellent adhesion ability to the curved outer panel of the vehicle.

Therefore, the expandable reinforcing sheet material in accordance with the present invention is suitably used for reinforcement of metal panel before electro deposition in particular.

Hereafter, the expandable reinforcing sheet material is described in more detail by the examples.

PRACTICE EXAMPLE

The practice example of the expandable sheet material that comprises the composition and the amount listed in table 1 is prepared.

NBR modified epoxy resin, bisphenol A type epoxy resin, thermal stabilizer, polyvinyl chloride, carbon black, expansion agent and expansion accelerator are inserted into the kneader.

Next, the adhesion agent is prepared by melting the monomeric interpolymerization resin of vinyl acetate and vinyl chloride into the mixed plasticizer. And a reinforcing composition is prepared by additionally input into the prepared adhesion agent above into the kneader and dicyandiamide is input and mixed by the kneader or high speed mixer.

The reinforcing composition is extruded by the extrusion machine, and the reinforcing sheet in accordance with the present invention is prepared. Then the glass fiber is attached on the one surface of the expandable sheet 2 and the releasing paper is attached on the other surface of the expandable sheet 2.

TEST EXAMPLE

The test example of the expandable sheet 2 is prepared using the practice example described above.

At 20° C. of temperature, the restraint layer 1 comprising stainless or glass wool is attached on the one surface of the expandable sheet 2 of which color is gray color or black, and the releasing paper 3 is attached on the other surface of the reinforcing material 2. As the result of that, the reinforcing sheet for vehicle outer panel in accordance with the present invention is prepared.

Next, the releasing paper is removed, and the surface of the expandable sheet 2 is attached on the backside of the outer panel of vehicle. The expandable sheet 2 attached on the backside of the outer panel of vehicle is heated at 170° C. of temperature for 30 minutes. Then the expandable material 2 is naturally expanded, adhered and finally hardened.

Herewith, the test for the ratio of the expansion is carried out by the method according to KS M 2095 10 article.

TABLE 1

|  | Classification | Contents |
|---|---|---|
| Component of Composition | NBR modified epoxy resin | 14 |
|  | Bisphenol A type epoxy resin | 19 |
|  | PVC | 18.5 |
|  | Filler | 29 |
|  | Thermal stabilizer | 3.8 |
|  | Adhesion agent | 7 |
|  | Carbon black | 2 |
|  | Expansion agent | 4 |
|  | Expansion accelerator | 1.2 |
|  | Latent hardener (dicyandiamide) | 1.5 |
| Physical properties | Ratio of expansion (%) | 170 |
|  | Thickness (mm) | 1.0 |
|  | Weight (g) | 125 |

As is clear from the table 1, the reinforcing sheet materials for vehicle outer panel in accordance with the present invention have excellent adhesion ability. And outer panel of vehicle having the reinforcing sheet become lighter and thinner.

What is claimed is:

1. Expandable reinforcing sheet material comprising:

10~14 weight % of nitrile butadiene rubber (NBR) modified epoxy resin alone or nitrile butadiene rubber (NBR) modified epoxy resin mixed with another modified epoxy resin selected from the group consisting of carboxyl terminated butadiene acryonitrile polymer (CTBN), amine terminated butadiene acrylonitrile polymer (ATBN) and methacrylate vinyl terminated butadiene acrylonitrile polymer (VTBN), 5~20 weight % of bisphenol A type epoxy resin, 0.3~4 weight % of potassium-zincs thermal stabilizer, 17~30 weight % of calcium carbonate, 10~20 weight % of polyvinyl chloride, 1~2 weight % of carbon black, 3~5 weight % of azodicarbonamides expanding agent, 0.3~2 weight % of expanding accelerator, 4~7 weight % of adhesion providing agent, and 0.1~2 weight % of dicyandiamide.

2. Expandable reinforcing sheet comprising the reinforcing sheet material of claim 1, a restraint material selected from stainless steel and glass wool attached on one surface of the reinforcing sheet material, and a releasing paper attached on the other surface of the reinforcing sheet material.

\* \* \* \* \*